J. S. BEALS.
Plow-Colter.
No. 53,773.
Patented Apr. 10, 1866.
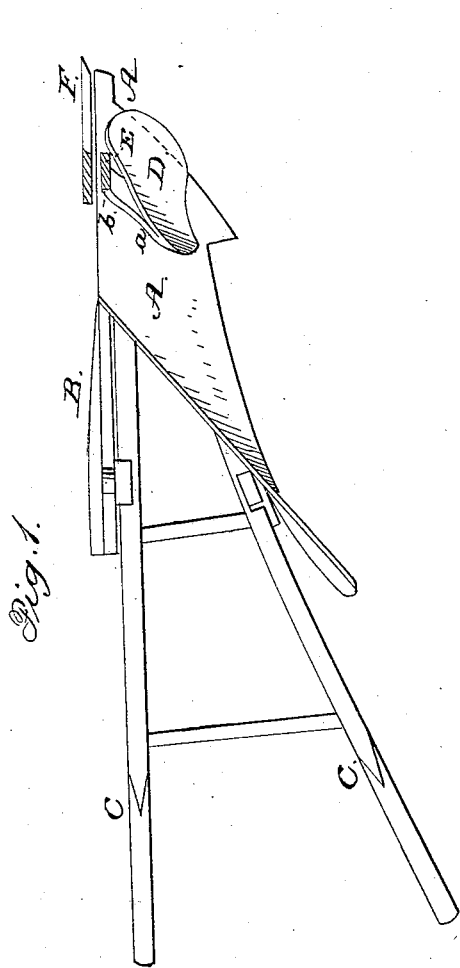
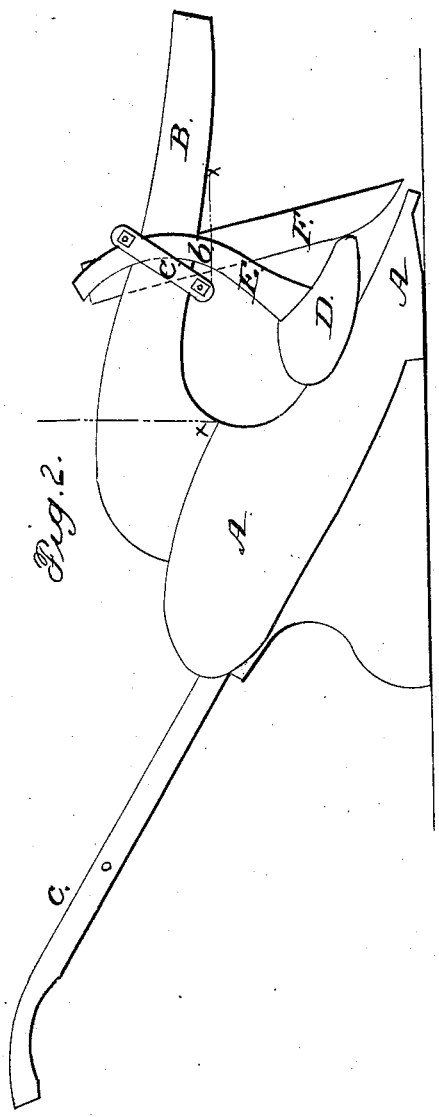

UNITED STATES PATENT OFFICE.

J. S. BEALS, OF ALABAMA CENTRE, NEW YORK.

IMPROVEMENT IN PLOWS.

Specification forming part of Letters Patent No. 53,773, dated April 10, 1866.

*To all whom it may concern:*

Be it known that I, J. S. BEALS, of Alabama Centre, Genesee county, State of New York, have invented a new and useful Improvement in Plows; and I do hereby declare that the following is a full, clear, and exact description thereof, which will enable others skilled in the art to make and use the same, reference being had to the accompanying drawings, forming part of this specification, in which—

Figure 1 is a horizontal section of my invention, taken in the line $x$ $x$, Fig. 2; Fig. 2, a side view of the same.

Similar letters of reference indicate like parts.

This invention relates to a new and useful improvement in that class of plows which have supplemental shares attached for the purpose of removing the sod or surface-soil separately from the earth turned over by the main share and mold-board, and to throw said sod or surface-soil into the bottom of the furrow made at the previous passage or bout of the plow, so that the lower soil turned over by the main share or plow will be thrown directly on the top of the sod or surface-soil.

The object of the invention is to obtain a simple arrangement for the purpose specified—one which will be light and not augment the draft of the plow, and possesses other advantages, hereinafter set forth.

A is the share and mold-board, B the beam, and C the handles, of an ordinary plow. These parts being old and well known do not require a special description.

D represents the supplemental share, which I construct of steel plate, of oblong form, with rounded ends, and bent so as to present a concave front surface of such a curvature which will be well calculated to work under the sod and surface-soil and turn it over to the right-hand side of the plow. This share D has a standard, E, attached to it by rivets, bolts, or other proper means, said standard being of T form, so that a bar, $a$, may extend along the whole length of its rear side, the share being secured to this bar, and the upright part $b$ of this standard is slightly curved, and is secured to the right-hand side of the plow-beam B by a clip, $c$. (See Fig. 2.)

The share D is back or at the rear of the colter E, and also at the rear of the point of the share of mold-board A, as shown clearly in Fig. 2, so that when the plow is at work the share D will cut longitudinally the upper portion of the furrow-slice partially elevated by A and throw said portion into the furrow previously made, alongside of which the plow is working, and then A will turn the lower portion directly upon the upper portion cut by D. This arrangement admits of the plow working smoothly, the plow not being liable to be thrown out of the ground, as is the case with other plows of a similar kind, which have their supplemental shares in advance of the share of the main plow.

The supplemental share cannot be injured by large and fast stones. The main plow protects it, and it consequently may be made thin and always be sharp and in good working condition.

Having thus described my invention, I claim as new and desire to secure by Letters Patents—

The supplemental share D, constructed substantially as shown and described, and attached to the plow-beam at the rear of the colter and point of the share of the main plow, as and for the purpose herein set forth.

J. S. BEALS.

Witnesses:
CHARLES E. CLARK,
S. H. CLARK, Jr.